United States Patent [19]

Ginster

[11] Patent Number: 4,617,220

[45] Date of Patent: Oct. 14, 1986

[54] SEALING AND TRIMMING STRIPS

[75] Inventor: Helmut Ginster, Viersen, Fed. Rep. of Germany

[73] Assignee: Draftex Industries Limited, Edinburgh, Scotland

[21] Appl. No.: 727,527

[22] Filed: Apr. 26, 1985

[30] Foreign Application Priority Data

Jun. 26, 1984 [GB] United Kingdom ............... 8416259

[51] Int. Cl.$^4$ ............................................. E06B 7/16
[52] U.S. Cl. .................................... 428/122; 49/490; 49/498; 428/358
[58] Field of Search ............... 428/122, 358; 49/475, 49/490, 498

[56] References Cited

U.S. PATENT DOCUMENTS

| 1,751,733 | 3/1930 | Griffiths | 428/122 X |
| 4,084,348 | 4/1978 | Hast | 49/475 |
| 4,232,081 | 11/1980 | Pullan | 49/490 X |
| 4,308,302 | 12/1981 | Etter et al. | 428/122 X |
| 4,348,443 | 9/1982 | Hein | 428/122 |
| 4,477,507 | 10/1984 | Kunert | 428/122 X |
| 4,520,055 | 5/1985 | Jeter | 428/122 X |

FOREIGN PATENT DOCUMENTS

| 747340 | 11/1966 | Canada | 428/16 |
| 0076749 | 4/1983 | European Pat. Off. | 428/122 |

*Primary Examiner*—Henry F. Epstein
*Attorney, Agent, or Firm*—Leydig, Voit & Mayer

[57] ABSTRACT

A sealing strip, such as for a motor vehicle body, comprises a base having wings which are integrally attached to a central portion by means of thinned-down regions permitting relative flexure. The wings and the central portion are preferably made of relatively hard plastics or rubber material. A tubular sealing section, of sponge or similar material, is integrally attached to the central portion. The wings carry layers of adhesive preferably covered with tear-off covering. The strip is fixed in position by placing the underside of the central portion over the distal edge of the door flange and then bending down the wings so as to press the adhesive into contact with the sides of the flange.

6 Claims, 4 Drawing Figures

SEALING AND TRIMMING STRIPS

BACKGROUND OF THE INVENTION

The invention relates to sealing and trimming strips particularly, though not exclusively, for use on motor vehicle bodies and the like, such as for sealing or trimming the edges of door or window openings.

BRIEF SUMMARY OF THE INVENTION

According to the invention, there is provided a sealing or trimming strip for mounting on a flange or the like running around an opening to be sealed or trimmed, comprising a longitudinal trimming part having a longitudinal base portion and at least one longitudinal other portion relatively flexibly supported thereon, whereby the strip may be mounted on the said flange or like by placing the base portion on the flange or the like and bending the said relatively flexibly supported portion with respect to the base portion so as to enable that portion to be adhesively secured to a side surface of the flange or the like, thereby attaching the strip to and in embracing relationship with the flange or the like.

According to the invention, there is further provided a sealing strip for sealing around a closeable opening in a vehicle body, comprising longitudinally extending relatively hard plastics or rubber material defining a central portion between and integrally attached to two longitudinally extending wings, the wings being attached to the central portion in a manner permitting relative flexing, each of the wings carrying respective layers of adhesive on corresponding surfaces, and relatively soft plastics or rubber material attached to the relatively hard plastics or rubber material so as to run along part thereof on the opposite side to the said surfaces carrying the adhesive, whereby the strip may be attached to the mounting flange by placing the central portion over the distal edge of the flange and flexing the wings relative to the central portion so as to bring the said adhesive into contact with the opposite side surfaces of the flange, thereby presenting the relatively soft material in a desired sealing position.

DESCRIPTION OF THE DRAWINGS

Sealing strips embodying the invention will now be described by way of example only and with reference to the accompanying diagramatic drawings in which.

DESCRIPTION OF PREFERRED EMBODIMENTS

Figure 1:
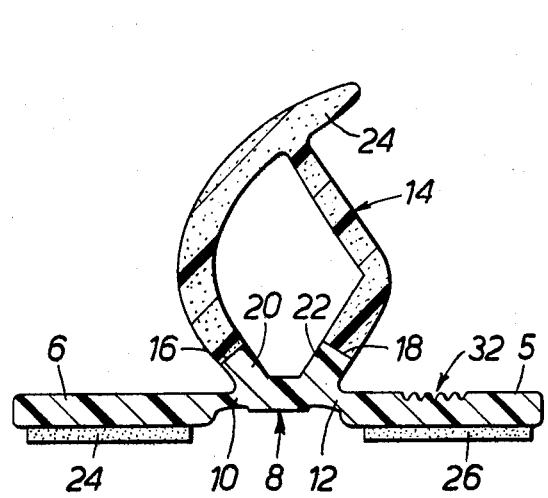
FIG. 1 is a cross-section through one form of the strip before it is fitted into position.

As manufactured, and before being fitted to the motor vehicle body, the sealing strip of FIG. 1 has a generally flat area formed by two wings 5 and 6 which are integral with a centre portion 8, the wings and the central portion being made of relatively hard rubber or plastics material for example. The central portion 8 is joined to the wings 5,6 by thinned-down regions 10 and 12 for a purpose to be described.

A sealing section 14, of hollow generally tubular form, is integrally joined along join lines 16 and 18 to shoulders 20 and 22 extending upwardly from the central portion 8. In this example, the sealing section 14 has an upwardly extending sealing lip 24.

Advantageously, the sealing section 14 is made of softer material (rubber or plastics preferably) than the material of the wings 5 and 6 and the central portion 8; for example, it may be made of foamed (or sponge) rubber or plastics material.

The sealing strip as described is preferably produced by an extrusion process. In the preferred case, where the material of the wings 5 and 6 and the central portion 8 differs from that of the sealing section 14, the extrusion process would be a dual extrusion process providing simultaneous extrusion of two different materials.

Suitable lengths of adhesive 24 and 26 are attached so as to run along the undersides of the wings 5 and 6. The lengths of adhesive 24 and 26 may take any suitable form. For example, they may simply be lengths of a suitable glue. Instead, however, they could be lenghts of adhesive tape whose outer-facing surfaces are protected with tear-off covering. Another possibility is to use lengths of unvulcanised butyl rubber again preferably covered with suitable tear-off covering.

Figure 2:
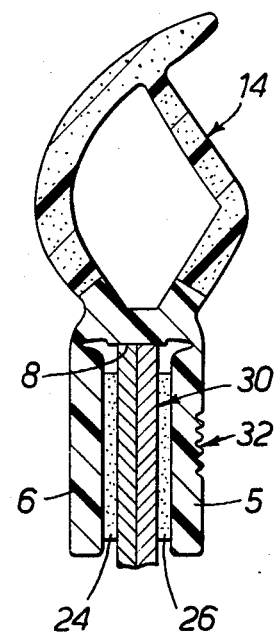
FIG. 2 is a cross-section through the strip of FIG. 1 showing it fitted into position on a motor vehicle body.

In use, the strip is fitted into position around the vehicle body opening to be sealed and trimmed by placing it on the flanged joint (FIG. 2) running around the opening, so that the distal edge of the flange abuts the under side of the central portion 8. The wings 5 and 6 are then bent downwards (after removing any protective covering over the adhesive layers 24 and 26) so as to press the adhesive layers into contact with the sides of the flange 30, all as shown in FIG. 2. The adhesive thus of course holds the strip in position. It will be apparent that the thinned-down regions 10 and 12, where the wings 5, 6 join with the central portion 8, assist this bendingdown of the wings.

The outer face of one or each of the wings 5 and 6 may be provided with suitable decoration such as shown at 32.

Figure 3:
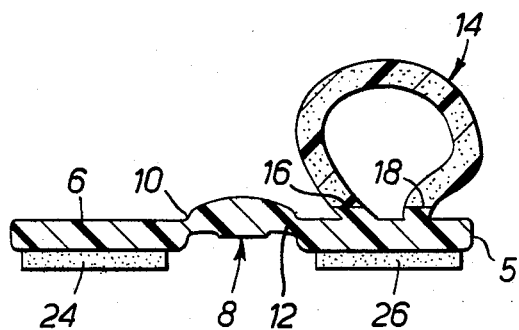
FIGS. 3 and 4 correspond respectively to FIGS. 1 and 2 but relate to another one of the sealing strips.
Figure 4:
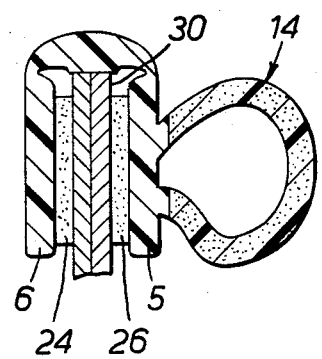

The strip shown is primarily intended for sealing around an opening in a vehicle body which has an upstanding flange, that is, a flange which projects perpendicularly to the plane of the opening. An example of such an opening is the luggage compartment or the engine compartment of a vehicle body. Therefore the sealing section 14 is so positioned that it is partially compressed by the door of such an opening so as to provide the necessary sealing action. However, the sealing strip may easily be modified so as to be suitable for a body opening where the flange around the opening lies in the plane of the opening. Examples of such openings in a vehicle body are door openings. In such cases, the sealing section 14 would not be attached to the central portion 8 but would be attached along the outer surface of one of the wings 5, 6 such as shown by way of example in FIG. 3. Therefore, when the strip is fitted onto the flange (in generally similar fashion to that described with reference to FIG. 2), the sealing section 14 now lies alongside the flange, as shown in FIG. 4, so as to be partially compressed by the closing door and thus to provide the necessary sealing action.

It will be observed that the sealing strip described employs no metal reinforcing core or carrier.

Various modifications may be made to the strip. For example, it may be arranged for it to be adhesively secured to one side only of the flange. In such a case for example, one of the wings 5,6, could be manufactured so as to be relatively rigidly held at right angles to the central portion 8. This wing would not be provided with an adhesive strip, though the other wing would. Such a strip could be fitted into position by placing the right-angled wing against one side of the flange and then bending down the other wing (after removing any protective covering on its adhesive strip) so as adhesively to secure it to the opposite side of the flange.

Advantageously, the action of pressing the wing or wings into adhesive contact with the flange is facilitated by use of a suitable tool which is designed to be run along the flange and provided with jaws (such as formed by spaced-apart rollers) which press the wings against the flange sides. The tool could include means for automatically removing the protective covering from the adhesive strips.

Such a tool could be modified so as to dispense adhesive onto the flange and/or the wings 5,6, before pressing the wings onto the flange, thus of course enabling the adhesive strips on the wings 5,6 to be eliminated. Such a tool could also be arranged to dispense a suitable cleaning agent on to the flange before the adhesive.

Where the strip is just intended for trimming purposes (that is, sealing is not required), the sealing section 14 (and the shoulders 20 and 22) can be eliminated.

The underside of the central portion 8 may also carry a layer of adhesive for securing the strip to the distal edge of the flange 30. Advantageously, the underside of the central portion may also be grooved or otherwise shaped to assist its contact with the flange edge.

What is claimed is:

1. A sealing or trimming strip for mounting on a flange or the like running around an opening to be sealed or trimmed, comprising a longitudinal trimming part having a first, longitudinal, base portion of relatively hard plastics or rubber material and second and third longitudinal portions also of relatively hard plastics or rubber material but relatively flexibly supported on the base portion along opposite longitudinally extending edges of the base portion, whereby the strip may be mounted on the said flange or the like by placing the first portion on the flange or the like and bending the said second and third portions with respect to the first portion so as to bring longitudinally extending surfaces of the second and third portions respectively into facing relationship with opposite longitudinally extending side surfaces of the flange or the like and so that the base portion and the second and third portions together define a channel-configuration extending longitudinally along the flange or the like, and adhesive means on the said longitudinally extending surfaces of the second and third portions for adhesively securing the said longitudinally extending surfaces of the second and third portions to the side surfaces of the flange or the like, thereby attaching the strip to, and so that the said channel-configuration is in embracing relationship with, the flange or the like.

2. A strip according to claim 1, in which the three said portions are integral.

3. A strip according to claim 1, in which the adhesive means comprises a respective length of adhesive covered with tear-off covering and carried by the second and third portions.

4. A strip according to claim 1, including relatively soft sealing material attached to and running along a surface of one of the said portions so as to be mounted in a desired sealing position when the strip is secured to the flange or the like.

5. A sealing strip for sealing around a closable opening in a vehicle body, comprising longitudinally extending relatively hard plastics or rubber material defining a central portion between and integrally attached to two longitudinally extending wings, the wings being attached to the central portion by thinned-down regions whereby to permit relative flexing, each of the wings carrying respective layers of adhesive on corresponding surfaces, the said regions defining shoulders by means of which relatively soft plastics or rubber material is attached to the relatively hard plastics or rubber material so as to define a longitudinally extending tubular configuration running along part of the relatively hard plastics or rubber material on the opposite side thereof to the said surfaces carrying the adhesive, whereby the strip may be attached to the mounting flange by placing the central portion over the distal edge of the flange and flexing the wings relative to the central portion so as to bring the said adhesive into contact with the opposite side surfaces of the flange, thereby presenting the relatively soft material in a desired sealing position.

6. A strip according to claim 5, in which the adhesive is covered with removable outer covering.

* * * * *